(12) United States Patent
Rotman et al.

(10) Patent No.: US 11,450,111 B2
(45) Date of Patent: Sep. 20, 2022

(54) DETERMINISTIC LEARNING VIDEO SCENE DETECTION

(71) Applicant: International Business Machines Corporation, Armonk, NY (US)

(72) Inventors: Daniel Nechemia Rotman, Haifa (IL); Rami Ben-Ari, Kiryat-Ono (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 17/004,046

(22) Filed: Aug. 27, 2020

(65) Prior Publication Data

US 2022/0067386 A1    Mar. 3, 2022

(51) Int. Cl.
*G06V 20/40* (2022.01)
*G06K 9/62* (2022.01)
*G06N 3/08* (2006.01)

(52) U.S. Cl.
CPC .......... *G06V 20/49* (2022.01); *G06K 9/6262* (2013.01); *G06N 3/08* (2013.01); *G06V 20/46* (2022.01)

(58) Field of Classification Search
CPC ........ G06K 9/6262; G06N 3/08; G06V 20/46; G06V 20/49; G06V 10/00; G06V 20/00; G06V 30/00; G06V 40/00; G06V 2201/00
See application file for complete search history.

(56) References Cited

U.S. PATENT DOCUMENTS

| | | | | |
|---|---|---|---|---|
| 7,227,893 | B1 * | 6/2007 | Srinivasa | G08B 13/19602 348/169 |
| 2004/0221237 | A1 * | 11/2004 | Foote | G06F 16/7328 707/E17.028 |
| 2006/0018516 | A1 * | 1/2006 | Masoud | G06T 7/254 382/115 |
| 2016/0050465 | A1 * | 2/2016 | Zaheer | H04N 21/6125 725/34 |
| 2017/0103264 | A1 * | 4/2017 | Javan Roshtkhari | G06V 20/48 |
| 2018/0061459 | A1 * | 3/2018 | Song | H04N 21/4828 |
| 2019/0042900 | A1 * | 2/2019 | Smith | G06V 20/00 |

(Continued)

FOREIGN PATENT DOCUMENTS

| | | |
|---|---|---|
| CN | 102509084 B | 5/2014 |
| CN | 103473555 B | 9/2016 |

(Continued)

OTHER PUBLICATIONS

Dong Xu , "Video Event Recognition Using Kernel Methods with Multilevel Temporal Alignment," May 30, 2008, IEEE Transactions on Pattern Analysis and Machine Intelligence, vol. 30, No. 11, Nov. 2008, pp. 1985-1995.*

(Continued)

*Primary Examiner* — Omar S Ismail

(74) *Attorney, Agent, or Firm* — David B. Woycechowsky

(57) ABSTRACT

A video scene detection machine learning model is provided. A computer device receives feature vectors corresponding to audio and video components of a video. The computing device provides the feature vectors as input to a trained neural network. The computing device receives from the trained neural network, a plurality of output feature vectors that correspond to shots of the video. The computing device applies optimal sequence grouping to the output feature vectors. The computing device further trains the trained neural network based, at least in part, on the applied optimal sequence grouping.

6 Claims, 8 Drawing Sheets

(56) References Cited

U.S. PATENT DOCUMENTS

| | | | |
|---|---|---|---|
| 2019/0147105 | A1 | 5/2019 | Chu |
| 2019/0354765 | A1* | 11/2019 | Chan ................ H04N 21/21805 |
| 2020/0034659 | A1 | 1/2020 | Sato |
| 2020/0193163 | A1* | 6/2020 | Chang ..................... G06F 3/013 |

FOREIGN PATENT DOCUMENTS

| | | |
|---|---|---|
| CN | 109919025 A | 6/2019 |
| CN | 110532868 A | 12/2019 |
| CN | 111340213 A | 6/2020 |
| CN | 111460979 A | 7/2020 |

OTHER PUBLICATIONS

Daniel Rotman, "Optimally Grouped Deep Features Using Normalized Cost for Video Scene Detection," Jun. 5, 2018, ICMR '18: Proceedings of the 2018 ACM on International Conference on Multimedia RetrievalJune 2018, pp. 187-194.*

Dong Xu, "Video Event Recognition Using Kernel Methods with Multilevel Temporal Alignment," May 30, 2008, IEEE Transactions o Pattern Analysis and Machine Intelligence, vol. 30, No. 11, Nov. 2008, pp. 1985-1995.*

Lorenzo Baraldi, "A Deep Siamese Network for Scene Detection in Broadcast Videos,", Oct. 13, 2015, MM '15: Proceedings of the 23rd ACM international conference on MultimediaOct. 2015, pp. 1199-1201.*

Amin Ullah, "Action Recognition in Video Sequences using Deep Bi-Directional LSTM With CNN Features," Nov. 28, 2017, IEEE Access (vol. 6), pp. 1155-1160.*

Daniel Rotman, "Optimally Grouped Deep Features Using Normalized Cost for Video Scene Detection," Jun. 5, 2018, ICMR '18: Proceedings of the 2018 ACM on International Conference on Multimedia RetrievalJun. 2018, pp. 187-194.*

Daniel Rotman, "Robust Video Scene Detection Using Multimodal Fusion of Optimally Grouped Features," Dec. 1, 2017, 2017 IEEE 19th International Workshop on Multimedia Signal Processing (MMSP), pp. 1-5.*

Vasileios T. Chasanis, "Scene Detection in Videos Using Shot Clustering and Sequence Alignment," Dec. 22, 2008, IEEE Transactions on Multimedia, vol. 11, No. 1, Jan. 2009, pp. 89-98.*

Muhammad Haroon, "Video Scene Detection Using Compact Bag of Visual Word Models," Nov. 8, 2018, Advances in Multimedia, vol. 2018 | Article ID 2564963 , pp. 1-6.*

Jiang et al., "A Scene Change Detection Framework Based on Deep Learning and Image Matching", Lecture Notes in Electrical Engineering, 2019, 9 pages, <https://www.academia.edu/40118327/A_Scene_Change_Detection_Framework_Based_on_Deep_Learning_and_Image_Matching>.

Baraldi et al., "A Deep Siamese Network for Scene Detection in Broadcast Videos", arXiv:1510.08893v1 [cs.CV], Oct. 29, 2015, 4 pages.

Haroon et al., "Video Scene Detection Using Compact Bag of Visual Word Models", vol. 2018, Article ID 2564963, 10 pages, <https://doi.org/10.1155/2018/2564963>.

Sukthankar et al., "Pornography Detection in Video Using Characteristic Motion Patterns", An IP.com Prior Art Database Technical Disclosure, IP.com No. IPCOM000251351D, IP.com Electronic Publication Date: Oct. 30, 2017, 9 pages.

Protasov et al., "Using Deep Features for Video Scene Detection and Annotation", Printed Aug. 4, 2020, 10 pages.

Rotman et al., "Optimal Sequential Grouping for Robust Video Scene Detection Using Multiple Modalities", International Journal of Semantic Computing, © World Scientific Publishing Company, Printed Aug. 4, 2020, 16 pages.

Rotman et al., "Optimally Grouped Deep Features Using Normalized Cost for Video Scene Detection", ICMR '18, Jun. 11-14, 2018, Yokohama, Japan © 2018 Association for Computing Machinery, ACM ISBN 978-1-4503-5046-4/18/06, 9 pages, <https://doi.org/10.1145/3206025.3206055>.

Rotman et al., "Robust and Efficient Video Scene Detection Using Optimal Sequential Grouping", 2016 IEEE International Symposium on Multimedia, 978-1-5090-4571-6/16, © 2016 IEEE, DOI 10.1109/ISM.2016.117, 6 pages.

Rotman et al., "Robust Video Scene Detection Using Multimodal Fusion of Optimally Grouped Features", 978-1-5090-3649-3/17, © 2017 IEEE, 6 pages.

Trojahn et al., "A new multimodal deep-learning model to video scene segmentation", Brazilian Symposium on Multimedia and the Web (WebMedia '18), Oct. 16-19, 2018, Salvador-BA, Brazil, 8 pages, <https://doi.org/10.1145/3243082.3243108>.

IBM Research Editorial Staff, "Video Scene Detection Using Optimal Sequential Grouping", Sep. 13, 2018, 12 pages, <https://www.ibm.com/blogs/research/2018/09/video-scene-detection/>.

Mell et al., "The NIST Definition of Cloud Computing", Recommendations of the National Institute of Standards and Technology, NIST Special Publication 800-145, Sep. 2011, 7 pages.

University of Shanghai for Science and Technology, CN 111460979A, "Key lens video abstraction method based on multi-layer space-time frame", Jul. 2020, p. 1-9.

"Deterministic Learning Video Scene Detection", App No. PCT CN2021/114749, filed on Aug. 26, 2021, 60 pages.

Patent Cooperation Treaty PCT, International Searching Authority, Notification of Transmittal of the International Search Report and the Written Opinion of the International Searching Authority, or the Declaration, dated Nov. 26, 2021, Applicants File Reference PF210461PCT, International Application No. PCT/CN2021/114749, International Filing Date Aug. 26, 2021, 9 pages.

* cited by examiner

DETERMINISTIC LEARNING VIDEO SCENE DETECTION

BACKGROUND OF THE INVENTION

The present invention relates generally to the field of video scene detection and more particularly to using neural networks in video scene detection.

Generally, video scene detection models utilize deterministic algorithms to learn representations of visual, textual, and audio features in video scenes.

SUMMARY

Embodiments of the present invention provide a method, system, and program product for a video scene detection machine learning model.

A first embodiment encompasses a method for a video scene detection machine learning model. One or more processors receive feature vectors corresponding to audio and video components of a video. The one or more processors provide the feature vectors as input to a trained neural network. The one or more processors receive from the trained neural network, a plurality of output feature vectors that correspond to shots of the video. The one or more processors apply optimal sequence grouping to the output feature vectors. The one or more processors further train the trained neural network based, at least in part, on the applied optimal sequence grouping.

A second embodiment encompasses a computer program product for video scene detection machine learning model. The computer program product includes one or more computer-readable storage media and program instructions stored on the one or more computer-readable storage media. The program instructions include program instructions to receive feature vectors corresponding to audio and video components of a video. The program instructions include program instructions to provide the feature vectors as input to a trained neural network. The program instructions include program instructions to receive from the trained neural network, a plurality of output feature vectors that correspond to shots of the video. The program instructions include program instructions to apply optimal sequence grouping to the output feature vectors. The program instructions include program instructions to further train the trained neural network based, at least in part, on the applied optimal sequence grouping.

A third embodiment encompasses a computer system for a video scene detection machine learning model. The computer system includes one or more computer processors, one or more computer-readable storage media, and program instructions stored on the computer-readable storage media for execution by at least one of the one or more processors. The program instructions include program instructions to receive feature vectors corresponding to audio and video components of a video. The program instructions include program instructions to provide the feature vectors as input to a trained neural network. The program instructions include program instructions to receive from the trained neural network, a plurality of output feature vectors that correspond to shots of the video. The program instructions include program instructions to apply optimal sequence grouping to the output feature vectors. The program instructions include program instructions to further train the trained neural network based, at least in part, on the applied optimal sequence grouping.

DETAILED DESCRIPTION

Figure 1:
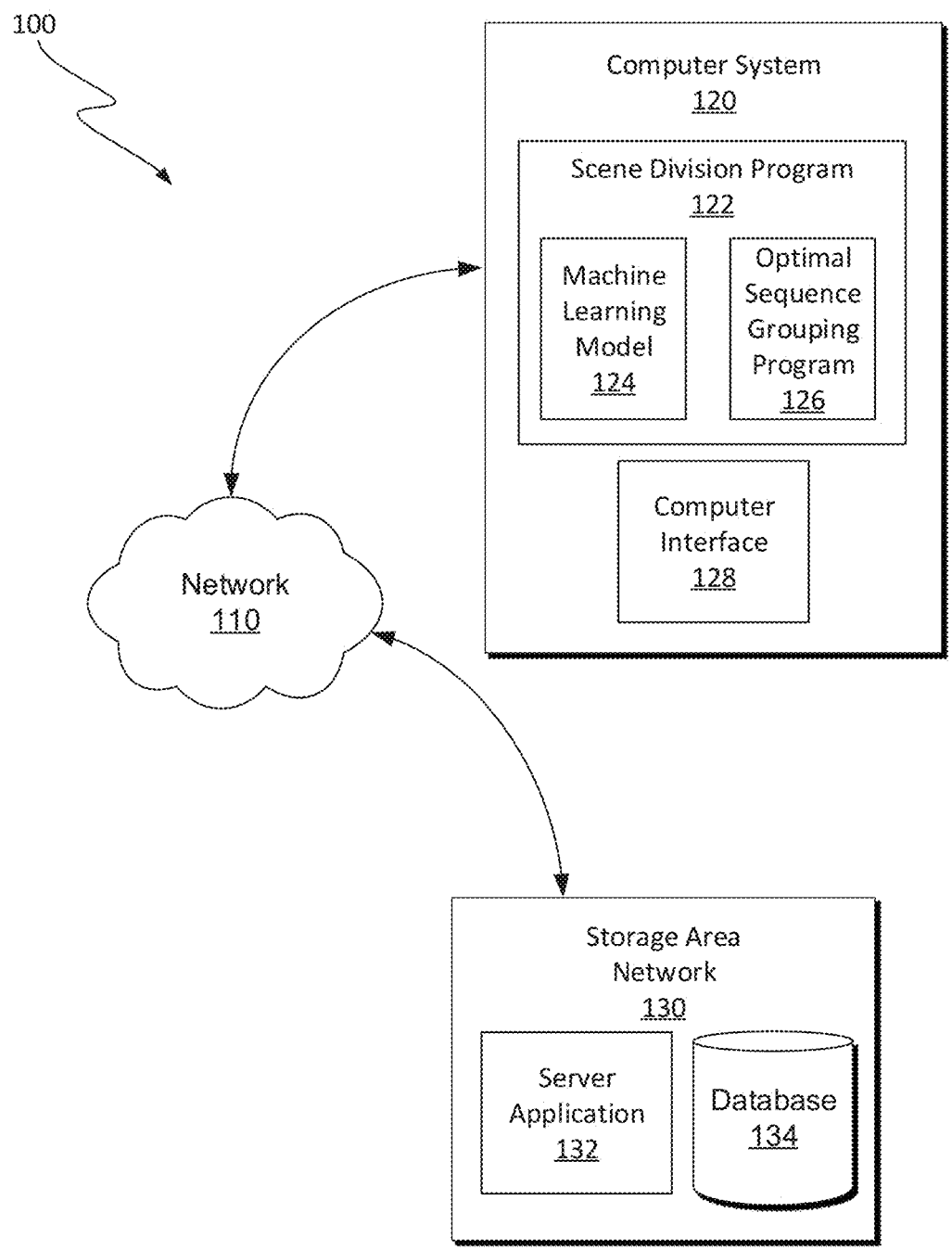
FIG. 1 is a functional block diagram illustrating a computing environment, in which a computing device generates a multimedia search engine through machine learning, accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention improve upon the accuracy of video scene detection models that include dividing video segments into scenes and further classifying those scenes. Known solutions to video scene detection models gather data with regards to video segments and scenes, and then extract the visual features and the textual features from those video segments and scenes. It is generally known that due to the limited amount of annotated data of video scene detection there does not exist an approach which creates a fully functional machine learning model via backpropagation While possible solutions provide for unsupervised approaches, generally these possible solutions group shots into scenes using keyframe similarity of a category of visual words descriptor, where a quantization method is used to provide a more robust descriptor. The grouping is performed using a sliding window algorithm which determines whether to combine shots or short scenes together. Generally, a sequence of deep features is clustered into scenes. Linking shots are combined using an overlapping links method which can be equivalent to a graph-based method. Additionally, evaluation is performed on a single point of view. Generally, possible solutions learn a distance measure utilizing a deep Siamese network (e.g., machine learning model) that applies spectral clustering to approximate scene boundaries of the distance measure. A joint representation of visual feature and textual features is learned for a similarity metric to represent the video. However, embodiments of the present invention provide for a learning pipeline into the scene division operation, where the learning could be seen as detached from the division stage similarly to cluster embedding.

Embodiments of the present invention improve upon the aforementioned solutions by combining a scene division solution that is not based on machine learning—specifically, optimal sequence grouping—with supervised machine learning to form a combined, robust scene division solution. In this way, as will be discussed further in this specification, embodiments of the present invention combine the benefits of both scene division methods while simultaneously avoiding many of their known deficiencies.

The present invention will now be described in detail with reference to the Figures.

FIG. 1 is a functional block diagram illustrating a computing environment, generally designated 100, in accordance with one embodiment of the present invention. Computing environment 100 includes computer system 120 and storage area network (SAN) 130 connected over network 110. Computer system 120 includes scene division program 122, machine learning model 124, optimal sequence grouping program 126 and computer interface 128. Storage area network (SAN) 130 includes server application 132 and database 134.

In various embodiments of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing scene division program 122, machine learning model 124, optimal sequence grouping program 126, and computer interface 128. Computer system 120 may include internal and external hardware components, as described in further detail with respect to FIG. 1.

In this exemplary embodiment, scene division program 122, machine learning model 124, optimal sequence grouping program 126, and computer interface 128 are stored on computer system 120. However, in other embodiments scene division program 122, machine learning model 124, optimal sequence grouping program 126, and computer interface 128 are stored externally and accessed through a communications network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, SAN 130, and various other computer systems (not shown), in accordance with desired embodiment of the present invention.

In various embodiments, of the present invention, the various other computer systems (not shown) can be a standalone device, a server, a laptop computer, a tablet computer, a netbook computer, a personal computer (PC), a desktop computer, or any programmable electronic device capable of receiving, sending, and processing data. In another embodiment, the various other computer systems represent a computing system utilizing clustered computers and components to act as a single pool of seamless resources. In general, the various other computer systems can be any computing device or a combination of devices with access to computer system 120, SAN 130, and network 110 and is capable of executing scene division program 122, machine learning model 124, optimal sequence grouping program 126, and computer interface 128. The various other computer systems may include internal and external hardware components as depicted and described in further detail with respect to FIG. 1.

In the embodiment depicted in FIG. 1, scene division program 122, machine learning model 124, and optimal sequence grouping program 126, at least in part, have access to server application 132 and can communicate data stored on computer system 120 to SAN 130, and various other computer systems (not shown). More specifically, scene division program 122 defines a user of computer system 120 that has access to data stored on computer system 120 and/or database 134.

Scene division program 122 is depicted in FIG. 1 for illustrative simplicity. In various embodiments of the present invention, scene division program 122 represents logical operations executing on computer system 120, where computer interface 128 manages the ability to view these logical operations that are managed and executed in accordance with scene division program 122. In various embodiments, scene division program 122 includes, but is not limited to, machine learning model 124 and optimal sequence grouping program 126. In some embodiments, machine learning model 124 represents a cognitive AI system that processes and analyzes input and output (I/O). Additionally, machine learning model 124, when executing cognitive AI processing, operates to learn from the I/O that was analyzed and generates a distance matrix based on, but not limited to, the analyzation operation. In various embodiments, optimal sequence grouping program represents a deterministic optimization formulations to solve for video scene detection, where the formulations take a distance matrix of the shot representations (i.e., shots of a video) and calculates the optimal division given a cost function on the intra-scene distances.

Computer system 120 includes computer interface 128. Computer interface 128 provides an interface between computer system 120 and SAN 130. In some embodiments, computer interface 128 can be a graphical user interface (GUI) or a web user interface (WUI) and can display text, documents, web browsers, windows, user options, application interfaces and instructions for operation, and includes the information (such as graphic, text, and sound) that a program presents to a user and the control sequences the user employs to control the program. In some embodiments, computer system 120 accesses data communicated from SAN 130 or various other computer systems via a client-based application that runs on computer system 120. For example, computer system 120 includes mobile application software that provides an interface between computer system 120 and SAN 130.

Storage area network (SAN) 130 is a storage system that includes server application 132 and database 134. SAN 130 may include one or more, but is not limited to, computing devices, servers, server-clusters, web-servers, databases and storage devices. SAN 130 operates to communicate with computer system 120, and various other computing devices (not shown) over a network, such as network 110. For example, SAN 130 communicates with machine learning model 124 to transfer data between computer system 120 and various other computing devices (not shown) that are connected to network 110. SAN 130 can be any computing device or a combination of devices that are communicatively connected to a local IoT network, i.e., a network comprised of various computing devices including, but not limited to, computer system 120, to provide the functionality described herein. SAN 130 can include internal and external hardware components as described with respect to FIG. 8. Embodiments of the present invention recognize that FIG. 1 may include any number of computing devices, servers, databases, and/or storage devices, and the present invention is not limited to only what is depicted in FIG. 1. As such, in some embodiments, some or all of the features and functions of SAN 130 are included as part of computer system 120 and/or another computing device. Similar, in some embodiments, some of the features of computer system 120 are included as part of SAN 130 and/or another computing device.

Additionally, in some embodiments, computer system 120 and SAN 130 represent, or are part of, a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can rapidly be provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

SAN 130 is depicted in FIG. 1 for illustrative simplicity. However, it is to be understood that, in various embodiments, SAN 130 can include any number of databases that are managed in accordance with the functionality of server application 132. In general, database 134 represents data and server application 132 represents code that provides an ability to take specific action with respect to another physical or virtual resource and manages the ability to use and modify the data. In an alternative embodiment, scene division program 122 can also represent any combination of the aforementioned features, in which server application 132 has access to database 134. To illustrate various aspects of the present invention, examples of server application 132 are presented in which machine learning model 124 represents one or more of, but is not limited to, a local IoT network.

In some embodiments, server application 132 and database 134 are stored on SAN 130. However, in various embodiments, server application 132 and database 134 may be stored externally and accessed through a communication network, such as network 110, as discussed above.

In various embodiments of the present invention, scene division program 122 is a video scene detection model, wherein scene division program 122 divides a video into semantic temporal chapters. In various embodiments, machine learning model 124 represents a machine learning model that learns from an optimal sequential grouping algorithm (e.g., optimal sequence grouping program 126), wherein the learning is directed towards improving the results of the video division into semantic temporal chapters. Scene division program 122 provides feature representation of the video division through back-propagation, wherein the effect of changing the feature representation on the solution of the optimal sequential grouping algorithm is measured.

In various embodiments, scene division program 122 utilizes an inception-v3 architecture as a 2048-dimension visual backbone feature extractor for video analysis and a VGGish network to encode audio segments into 128-dimension vectors. In various embodiments of the present invention, computer system 120 includes machine learning model 124 which represents a machine learning model (e.g., a neural network) wherein the machine learning model comprises input/output (I/O) data, as well as multiple hidden layers of neurons (i.e., Rectified linear units (RELU) layer). In various embodiments, four fully-connected neural network layers are utilized to divide the video scene into semantic temporal chapters. In some embodiments, four layers are utilized for visual learning (e.g., 3000, 3000, 1000, 100 neurons) and four layers are utilized for audio learning (e.g., 200, 200, 100, 20 neurons). In various embodiments, machine learning model 124 applies batch normalization to, at least, the four layers for visual learning and the four layers for audio learning. Additionally, in various embodiments, machine learning model 124 applies ReLU activations to all layers of the neural network excluding the output layer. In various embodiments, machine learning model 124 utilizes an optimization framework to train the neural network at a learning rate of $5\times10^{-3}$. One having ordinary skill in the art would understand that the learning rate is a unit-less ratio multiplying the gradient. Machine learning model 124 applies a stopping criterion to avoid overfitting of the neural network, and the training module of the neural network is aborted when the training loss is decreased to 25% of the initial value. Additionally, machine learning model 124 normalizes the cosine distance (A), of equation (7) below, between 0 and 1. The margin (a), the value parameter of equation (7), is chosen as 0.5. Further, a long-elbow approach, as defined below, is utilized by machine learning model 124 to estimate the number of scenes from the video file (e.g., semantic temporal chapters). An optimization framework includes, but is not limited to, a gradient descent or ADAM optimization to learn the parameters of the machine learning model.

In various embodiments, machine learning model 124 divides a video into semantic temporal chapters to generate a block-diagonal of the distance matrix, wherein the distance matrix represents the intra-scene distances.

In various embodiments of the present invention, machine learning model 124 calculates the similarity of shots belonging to the same scene as compared to shots belonging to different scenes. In various embodiments, the similarity of scenes is represented as a distance matrix and, generally, a block-diagonal structure is generated to represent that shots belonging to the same scene of a video will likely have lower distance values than shots belonging to different scenes. In various embodiments, optimal sequence grouping program 126 utilizes the optimal sequential grouping algorithm to accomplish the division of the distance matrix represented by a block-diagonal structure with the lowest intra-scene distances.

In various embodiments, the scenes of a video include one or more shots and each shot of the scene is represented by a plurality of feature vectors. A sequence of N feature vectors is denoted as $X_1^N=(x_1, \ldots, x_n)$. A partitioning of the sequence into K groups is provided by $t=(t_1, \ldots, t_k)$ where $t \in \mathbb{N}$ denotes the index of the last feature vector in group i. A distance matrix $D((x_1, x_2)$ measures the dissimilarity between two feature vectors. These distances (e.g., D) guide a cost function $H(\bar{t}) \in \mathbb{R}$ which measures the loss of a given division. In various embodiments, scene division program 122 determines the optimal division of $X_1^N$ by calculating t*=arg min (H).

In various embodiments, the additive cost function for a given division is defined as: $H(t)=\Sigma_{i=1}^K \Sigma_{j_1,j_2=t_{i-1}+1}^{t_i} \Sigma D(x_{j_1}, x_{j_2})$ (e.g., equation (1)), wherein the abbreviated notation of the double-indexed sum indicates that $j_1$ and $1_2$ run from $t_{i-1}+1$ to $t_i$. Machine learning model 124 sums all of the intra-group distances over all of the groups in the division, wherein this sum measures a low-valued block diagonal structure.

In various embodiments, optimal sequence grouping program 126 utilizes the following recursive dynamic programming table to find the optimal division t*: $C(n, k)=\min_i \{\Sigma_{j_1,j_2=n}^i \Sigma D(x_{j_1}, x_{j_2})+C(i+1, k-1)\}$ (e.g., equation (2)). In various embodiments C(n, k) is the optimal cost when dividing $X_n^N$ into k groups. Scene division program 122 determines the best cost for dividing a subsequence which begins at index n, where i is the location of the first point of division for the subsequence. Optimal sequence grouping program 126 constructs the block-diagonal structure with descending n (e.g., increasingly longer sequences) and ascending k (e.g., rising number of divisions) to aggregate the partial solutions. The calculation results in C(1, K)=H (t*), and optimal sequence grouping program 126 reconstructs t* by storing the indexes of the chosen divisions from equation (2).

In various embodiments of the present invention, optimal sequence grouping program 126 estimates the number of divisions of K by using either a log-elbow approach, a gap statistic, or another method for estimation known in the art to estimate the number of clusters in a given data point.

In various embodiments of the present invention, optimal sequence grouping program 126 estimates the number of divisions of K using a log-elbow approach. In various embodiments, optimal sequence grouping program 126 calculates the singular values of the distance matrix and a graph of the log values is analyzed. In some embodiments, one or more points of a plateau are present on the graph, wherein the one or more points of a plateau represent the number of blocks with intuition from performing a low-rank matrix approximation. In various embodiments, optimal sequence grouping program 126 determines the plateau points from the log-elbow estimation, wherein s is the log singular values of length N, and optimal sequence grouping program 126 considers the index of each value as the first dimension. The vector $I_i=[i,s_i]^T$ represents the values of the graph and the diagonal is represented by $H=[N-1, s_N-s_1]^T$. Additionally, optimal sequence grouping program 126 utilizes a Euclidean distance to each point and identifies the index of the plateau point as:

$$\log - \text{elbow} = \text{argmax}\left\{I_i - \frac{I_i^T H}{\|H\|}, \frac{H}{\|H\|}\right\} \text{ (e.g., equation (3)).}$$

In various embodiments, optimal sequence grouping program 126 incorporates multiple modalities, wherein the distance of each modality on the block-diagonal structure is utilized to build a table $C_x$, $C_y$, where the subscript indicates the modality, and $Y_1^N=(y_1, \ldots, y_N)$ represents an additional modality. In various embodiments, optimal sequence grouping program 126 does not choose the point of the division which yields the lowest cost for a single modality, and instead chooses the modality that has a more pronounced division point. In various embodiments, scene division program 122 defines $G_x^{n,k}(i)=\Sigma_{j_1,j_2=n}^i \Sigma D_x(x_{j_1},x_{j_2})+C_x(i+1, k-1)$ (e.g., equation (4)), where $G_x^{n,k}$ represents the minimum function of equation (2). In various embodiments, scene division program 122 normalizes $G_x^{n,k}$ to determine the relative inclination for division:

$$\widehat{G_x}(i) = \frac{G_x(i) - \text{mean}\{G_x\}}{std\{G_x\}} \text{ (e.g., equation (5)),}$$

wherein optimal sequence grouping program 126 calculates that the index is chosen as $\text{argmin}\{\min(\widehat{G_x}(i), \widehat{G_y}(i))\}$.

In some embodiments, optimal sequence grouping program 126 utilizes a cost normalization cost function $$H_{nrm}(\bar{t}) = \frac{\sum_{t=1}^{K} \Sigma \sum_{j_1,j_2=t_{i-1}+1}^{t_i} D(x_{j_1}, x_{j_2})}{\sum_{t=1}^{K}(t_i - t_{i-1})^2 - N} \text{ (e.g., equation (6)).}$$

In these cases, the cost function considers the same distances but normalizes by the area of the block diagonal. There may be beneficial mathematical properties within the cost function of equation (6). In some embodiments the cost function of equation (6) can be chosen to be foregone because it adds an additional computational complexity to the dynamic programming solution.

In various embodiments of the present invention, optimal sequence grouping program 126 follows the calculations of equations (1)-(5), identified above, to emphasize the block-diagonal structure in the distance matrix. In various embodiments, optimal sequence grouping program 126 applies a block-diagonal loss to strengthen the block-diagonal structure in the distance matrix.

In various embodiments, applying a triplet loss allows learning of the optimal sequential grouping algorithm using an embedding. The triplet loss learns a feature space embedding where samples from the same class are close in the feature space while samples from different classes are further apart, and further allows samples of video scenes to cluster together. In various embodiments, in the embedding where shots are clustered into scenes, the intra-scene distances will be reduced compared to the inter-scene distances to cause the optimal sequential grouping algorithm to arrive at the correct division for the scenes. In some embodiments, $L(x_i) \in [1, K]$ indicates the number of scenes that feature vector $x_i$ is associated with. In various embodiments, the neural network parameters are learned by minimizing the triplet loss $\Sigma \min(Dx_i, x_i^p) - D(x_i, x_i^n) + \alpha, 0)$ (e.g., equation (7)). In various embodiments, for $x_i$, a positive and negative pair are chosen, where $L(x_i) = L(x_i^p)$ and $L(x_i) \neq L(x_i^n)$, and where a is a margin parameter. In some embodiments, the samples are chosen using a semi-hard approach, where the triplets that satisfy the condition of $D(x_i, x_i^p) < D(x_i, x_i^n) < D(x_i, x_i^p) + \alpha$ are chosen. In some embodiments, the triplet loss function can improve the optimal sequential grouping algorithm in the division. In some embodiments, however, division probability loss, as defined below, has a greater improvement on the algorithm.

In various embodiments, optimal sequence grouping program 126 presents the distance values in a matrix D, where the i-th row and j-th columns are represented as $D_{i,j} = D(x_i, x_j)$, then scene division program 122 defines the optimal D* as:

$$D^*_{i,j} = \begin{cases} 0 & L(x_i) = L(x_j) \\ 1 & \text{else} \end{cases} \text{ (e.g., equation (8))}.$$

In these embodiments, 0 is the minimal distance and is allocated for features from the same scene, and 1 is the maximal distance for features from different scenes. In various embodiments, optimal sequence grouping program 126 drives D towards D* to enhance the optimal sequential grouping, as identified above, to calculate the correct division of the scenes of the video. In various embodiments, optimal sequence grouping program 126 calculates the loss by utilizing the Frobenius norm of the subtraction of matrix D: $\|D - D^*\|_F = \sqrt{\Sigma_i \Sigma_j |D_{i,j} - D^*_{i,j}|^2}$ (e.g., equation (9)).

Embodiments of the present invention provide that the features extracted from the video scene division are fed through the fully connected neural network that outputs an embedding. In various embodiments, the embedding is calculated utilizing the optimal sequential grouping algorithm, wherein the division of the video scenes is determined. Optimal sequence grouping program 126 calculates the loss by measuring the error in the division of the video scenes, wherein optimal sequence grouping program 126 backpropagates the loss through the optimal sequential grouping algorithm, as opposed to placing the loss directly back into the embedding output.

In various embodiments of the present invention, optimal sequence grouping program 126 does not consider the inter-scene distances between scenes which are not adjacent to each other (e.g., OSG-block-adjacent). In various embodiments, various scenes through the video may be quite similar to each other, however, the distances between the semantic temporal chapters of the scenes or an intervening scene will indicate their distinction. In various embodiments, the cost function of equation (1) accumulates the inner values of the block-diagonal structure, wherein the far off-diagonal values do not impact the decision to calculate the correct division of the scenes of the video, so long as the values of the temporal distance of equation (1) are large enough. In various embodiments, the block-diagonal loss receives only a subset of the values from equation (1). In various embodiments of equation (9), j will execute only values that satisfy the constraint of: $L(x_i) - 1 \leq L(x_j) \leq L(x_i) + 1$, wherein only the intra-scene distances and the distances between feature vectors of the block-diagonal structure belonging to neighboring scenes are considered by scene division program 122.

In various embodiments of the present invention, optimal sequence grouping program 126 follows the calculations of equations (1)-(5), identified above, to learn directly from the optimal sequential grouping to enhance the performance of the optimal sequential grouping algorithm. In various embodiments, optimal sequence grouping program 126 alters equations (1)-(5) to calculate for division probabilities in the distance matrix. In response, optimal sequence grouping program 126 learns to raise the probability for the divisions of the scenes at the correct location. In various embodiments, optimal sequence grouping program 126 utilizes equation (2) to calculate the optimal locations of the divisions of scenes. Additionally, optimal sequence grouping program 126 utilizes equation (4) and retains the relative inclinations for divisions of scenes. However, in place of equation (5), optimal sequence grouping program 126 generates the probability vector that includes an established softmin operator and aggregates the values in a larger table:

$$C(n, k, i) = \frac{\exp(-G^{n,k}(i))}{\sum_j \exp(-G^{n,k}(j))} \text{ (e.g., equation (10))}.$$

In various embodiments, optimal sequence grouping program 126 calculates the values of this table and represents the probability to divide the video at point i when dividing n into k scenes. Optimal sequence grouping program 126 averages the probabilities in equation (10) over n and k and generates a vector of scores for the division of scenes at each location in the video, which is represented as:

$$T(i) = \frac{1}{N * K} \sum_n \sum_k C(n, k, i) \text{ (e.g., equation (11))}.$$

In various embodiments, optimal sequence grouping program 126 utilizes cross-entropy loss on the probabilities of equation (11) at the indexes where a division is anointed as: $-\Sigma_{i \in \overline{GT}} \log(T(i))$ (e.g., equation (12)). In various embodiments, optimal sequence grouping program 126 calculates that various divisions of the scenes result in a high average probability that indicates a division at that index.

Embodiments of the present invention provide for a system that includes triplet loss, block-diagonal loss, and more specifically division probability loss to be applied to a neural network for learning associated with video scene detection. In various embodiments, triplet loss and block-diagonal loss strive to minimize the distances between shots from the same scene and raise the distances between shots belonging to different scenes. A difference between triplet loss and block-diagonal loss is that block-diagonal loss strives to strengthen the block-diagonal structure to improve the performance of the optimal sequential grouping algorithm. While triplet loss focuses on distance samples, block-diagonal loss concentrates on the complete structure.

In various embodiments, the three losses affect the gradients of the distance matrix. In some embodiments, triplet loss is dependent on individual values of distances, block-diagonal loss puts emphasis on the entire block diagonal structure of the ground truth scenes, and division probability loss has a local impact focused around the points of division. For division probability loss this is a direct outcome of the formulation which emphasizes the value of the average probability of the scene division.

Embodiments of the present invention provide for division probability loss which has a configuration which is reliant on division locations as opposed to the block-diagonal structure. Such a structure allows the optimal sequential grouping algorithm to be integrated into a larger learning neural network model. In various embodiments, division probability loss sums all the values of n and k when constructing T. In some embodiments, if i is a ground truth division location, but there are additional ground truth divisions between n and i, then C(n, k, i) should not be a large value. In various embodiments, $G^{n,k}$ (i) holds the optimal cost when placing the first division after n and i and dividing into k groups. If there is a ground truth scene before i or if n is to be divided into more than or less than k scenes, then we cannot expect the probability for division to be high. In some embodiments, this allows the network to learn reduced distance values outside of the block diagonal structure.

Figure 2:
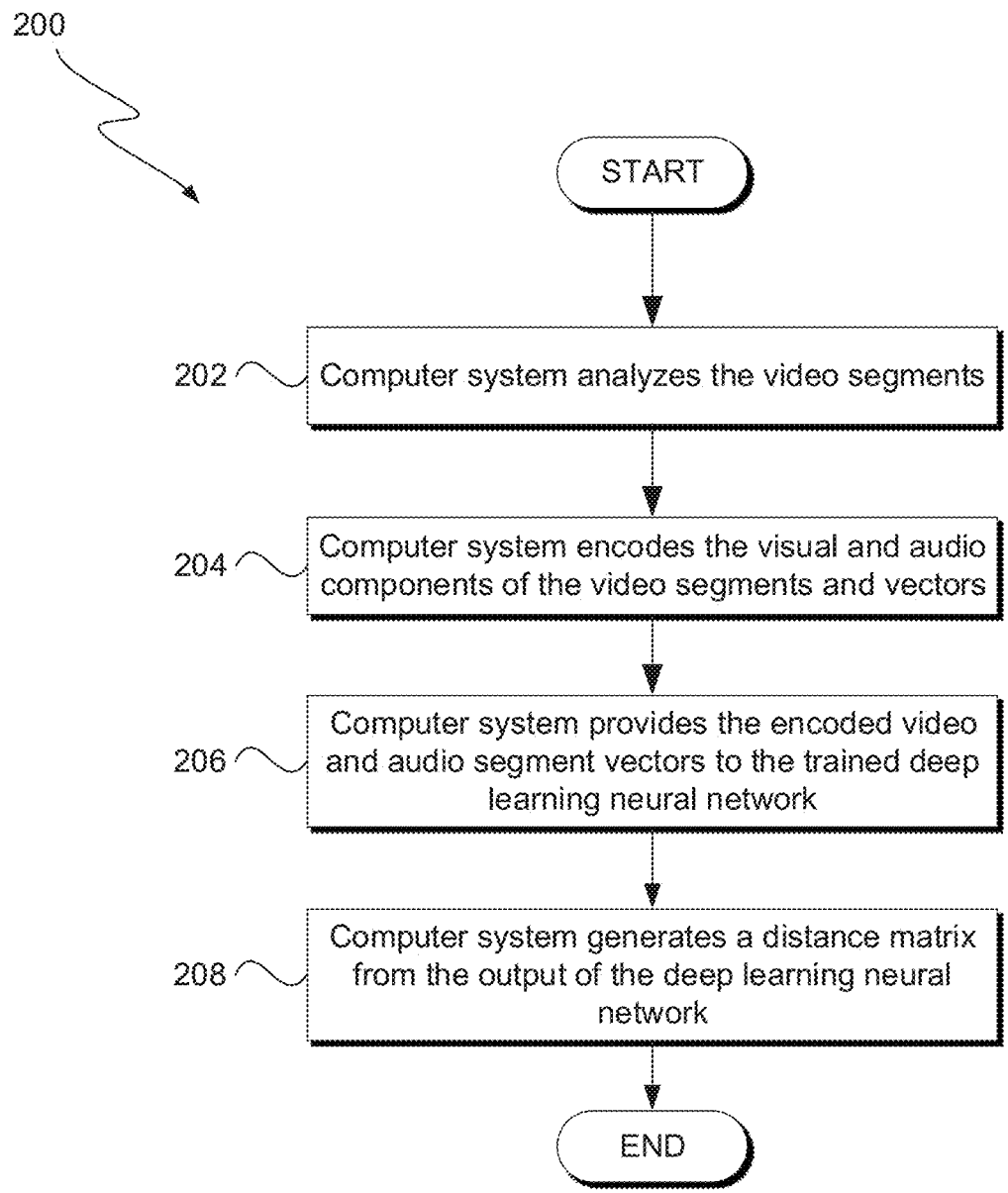
FIG. 2 illustrates operational processes of executing a system for a multimedia search engine, on a computing device within the environment of FIG. 1, in accordance with an exemplary embodiment of the present invention.

FIG. 2 is a flowchart 200, depicting operations of scene division program 122 in computing environment 100, in accordance with an illustrative embodiment of the present invention. FIG. 2 also represents certain interactions between machine learning model 124 and server application 132. In some embodiments, the operations depicted in FIG. 2 incorporate the output of certain logical operations of optimal sequence grouping program 126 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series operations depicted in FIG. 2 can be performed in any order. In another embodiment, the series of operations, depicted in FIG. 2, can be performed simultaneously. Additionally, the series of operations depicted in FIG. 2, can be terminated at any operation. In addition to the features previously mentioned, any operations, depicted in FIG. 2, can be resumed at any time.

In some embodiments, machine learning model 124 divides a video file into semantic temporal chapters, wherein machine learning model 124 utilizes optimal sequential grouping and deep learning modules to cluster and identify similarities of video shots and/or scenes (e.g., semantic temporal chapters) based on, but not limited to, a distance matrix represented by a block-diagonal structure output by machine learning model 124.

In operation 202, scene division program 122 analyzes the video segments of the video file. In various embodiments, scene division program 122 receives a video file from database 134.

In operation 204, scene division program 122 encodes the visual and audio video components of the video segments and vectors, for input into machine learning model 124 (e.g., a deep learning neural network). In various embodiments, scene division program 122 utilizes a pre-trained Inception-v3 architecture which includes a 2048-dimension visual backbone feature extractor. In some embodiments, scene division program 122 extracts features that include, but are not limited to, objects present in the shot of the video, characters, weather patterns, activities (e.g., travel, meals, etc.), emotional invocations, etc. Additionally, in various embodiments, scene division program 122 encodes the audio segments related to the video segments into 128-dimensional vectors. Embodiments of the present invention recognize that encoding the video and audio segments into 2048-dimension and 128-dimension vectors, respectively, is for the purposes of the deep learning neural network. Machine learning model 124 connects four neural network layers (e.g., 3000, 3000, 1000, 100) for visual segments and four neural network layers (e.g., 200, 200, 100, 20) for audio segments. In various embodiments, machine learning model 124 applies batch normalization to all layers within the deep learning neural network, and machine learning model 124 applies ReLU activations to all layers of the deep learning neural network excluding the output layer.

In operation 206, scene division program 122 provides the encoded video and audio segment vectors to the trained deep learning neural network. In this operation, machine learning model 124 (e.g., the deep learning neural network) receives, as input, the respective vectors for the video and audio segments of the video file. In response, machine learning model 124 generates, as output, shot feature vectors that are generally grouped based on a likelihood that the shots are in the same scene. For example, in these embodiments, shots that have vectors that are relatively close to each other are likely to be in the same scene.

In various embodiments, scene division program 122 initially trains machine learning model 124 using annotated video scene datasets that include, but are not limited to, an open video scene detection (OVSD) dataset to detect the video segments of the video file.

In operation 208, scene division program 122 generates a distance matrix from the output of machine learning model 124 (i.e., the shot feature vectors). In various embodiments, a block-diagonal structure is generated based, at least, on the distance matrix. In various embodiments, scene division program 122 generates the block-diagonal structure, wherein shots with a higher relative similarity are assigned a brighter-intensity than shots that are less similar. In various embodiments, the distance between each diagonal block represents a sequence of shots. In some embodiments, a dark block is a sequence of shots with low intra-distances, which likely indicates a scene of the video. In subsequent operations, which will be discussed below, scene division program 122 utilizes the distance matrix represented by a block-diagonal structure and applies multimodal optimal sequential grouping (e.g., optimal sequence grouping program 126) to further enhance the accuracies of the visual and audio embedding and the representation of the distance matrix of the various shots within the video file. In various embodiments, equations (1)-(6) (e.g., multimodal optimal sequence grouping) are applied to the data of the feature vectors which is represented by the block-diagonal structure that provides for the distances between the shots of the video.

Figure 3:
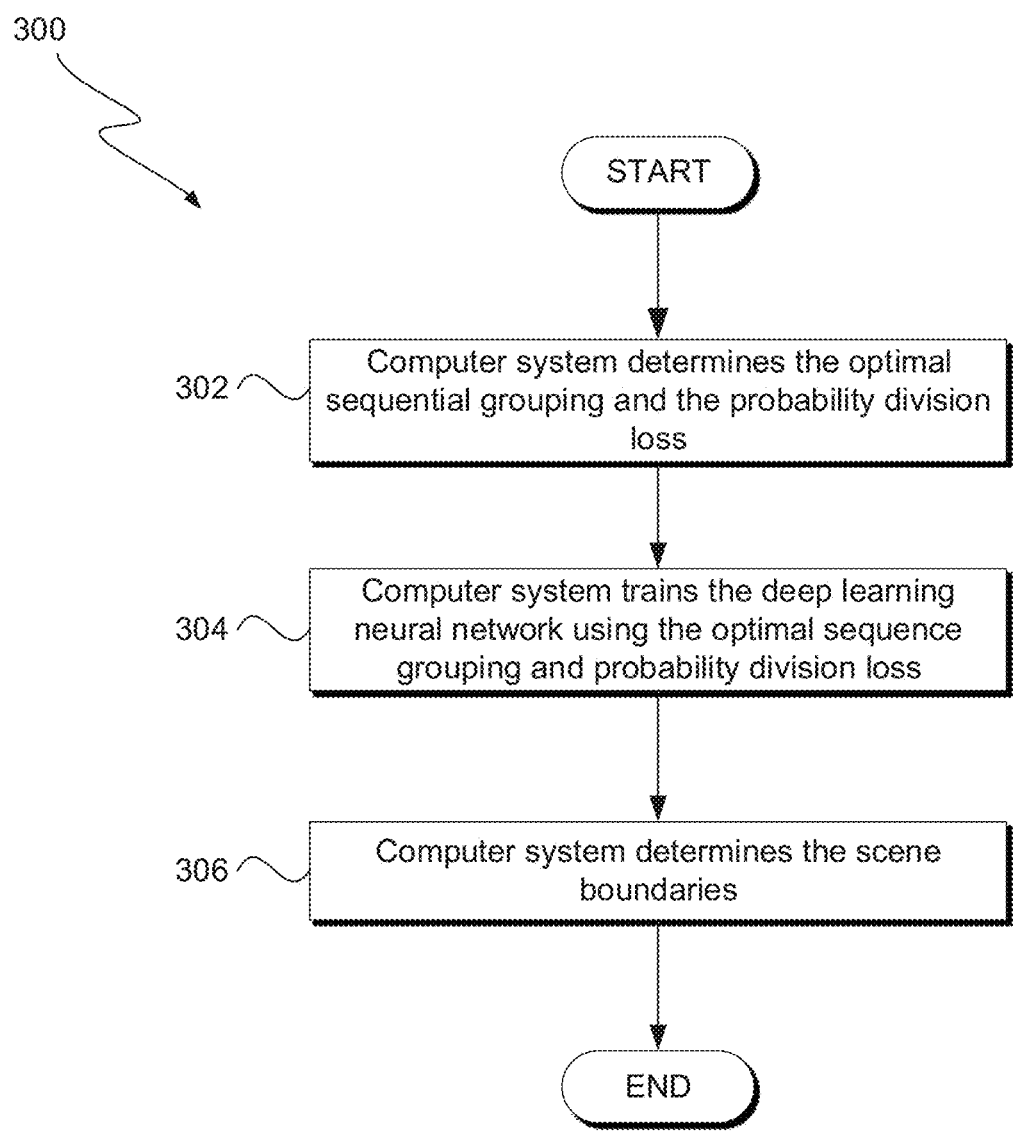
FIG. 3 illustrates operational processors of executing a system for a multimedia search engine, on a computing device within the environment of FIG. 1, in accordance with an exemplary embodiment of the present invention.

FIG. 3 is a flowchart depicting operations for determining scene boundaries based on a received distance matrix, for computing environment 100, in accordance with an illustrative embodiment of the present invention. More specifically, in this embodiment, FIG. 3, depicts overall operations, 300, of scene division program 122 executing on computer system 120. FIG. 3 also represents certain interactions between machine learning model 124 and server application 132. Further, operations 300 can include a portion or all of combined overall operations of 200. In various embodiments, the series of operations 300 can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations depicted in FIG. 3 can be performed in any order. In another embodiment, the series of operations depicted in FIG. 3 can be performed simultaneously. Additionally, the series of operations depicted in FIG. 3, can be terminated at any operations. In addition to the features mentioned, any operations, depicted in FIG. 3, can be resumed at any time.

In operation 302, optimal sequence grouping program 126 determines the optimal sequential grouping and the probability division loss based on the distance matrix generated in operation 208. In various embodiments, optimal sequence grouping program 126 determines from the distance matrix various sequences of shots that have similar features extracted from the video scenes. Further, optimal sequence grouping program 126 identifies one or more blocks from the diagonal-block structure that represent lower values that indicate the likelihood of a scene that includes a plurality of shots. Embodiments of the present invention provide that the diagonal-block structure is the visual representation of the distance matrix, and the distance matrix represents values that represent the intra-distances between the video scenes. In various embodiments, optimal sequence grouping program 126 utilizes equations (1)-(5) to calculate the values of the normalized cost function based on, at least, the determined scene distances. Additionally, optimal sequence grouping program 126 utilizes the values calculated from equations (1)-(5) and inserts the values into equations (10)-(12) to calculate the values for the probability division loss. Embodiments of the present invention provide that optimal sequence grouping program 126 utilizes the values of the probability division loss to further train the machine learning model to enhance the prediction of the video scene detection.

In various embodiments, optimal sequence grouping program 126 applies OSG-Prob to the division of the scenes. In various embodiments, optimal sequence grouping program 126 calculates the probability of the division at the correct location in the distance matrix through equations (10)-(12). In some embodiments, optimal sequence grouping program 126 determines an error in the various divisions of the scenes in the distance matrix. As will be discussed in relation to operations discussed below, optimal sequence grouping program 126 back-propagates the error in the divisions of the scenes through the machine learning model to generate new output embeddings, wherein the loss reflects the changes in the learning of the neural network. In various embodiments, optimal sequence grouping program 126 learns through the division probability loss and determines the division of the scenes at more accurate locations and generates an enhanced distance matrix that represents a greater defined blocks of a sequence of shots in the block-diagonal structure.

In operation 304, after determining the optimal sequence grouping and performing the probability division loss, machine learning model 124 trains the deep learning neural network using the optimal sequence grouping and probability division loss. In various embodiments, program 122 applies the probability division loss to the original output of the deep learning neural network, and then uses the updated output to train the deep learning neural network via back-propagation. In various embodiments, machine learning model 124 learns from the data of the shots of the video file, after the data of the shots have been updated based on optimal sequence grouping and probability division loss.

In various embodiments of the present invention, scene division program 122 feeds the video shot features through the enhanced machine learning model 124, where the probability division loss enhances the machine learning model, wherein the 2048-dimensional vectors and the 128-dimensional vectors are encoded into respective feature vectors of the video scenes. In some embodiments, the output of the machine learning model generates an enhanced embedding, where the enhanced embedding is processed by the optimal sequential grouping algorithm, as identified above. In various embodiments, the embedding is represented by a feature space embedding where the samples from the video scenes are relatively close with regards to the video and audio features extracted from the video scenes. Embodiments of the present invention provide that the output of the enhanced machine learning model includes the enhanced embedding which represents the distances between the video scenes.

Embodiments of the present invention provide that, in training the deep learning neural network, scene division program 122 provides (i) the original audio and video feature vectors encoded in operation 204 and (ii) the division probability loss, calculated from equations (10)-(12), applied to the original output of the deep learning neural network, to the deep learning neural network of machine learning model 124. In various embodiments, scene division program 122 utilizes the updated feature vectors represented by the division probability loss to train machine learning model 124 to more accurately determine the similarity between the video scenes. In various embodiments, the enhanced machine learning model determines video scenes that are greater in similarity that various other video scenes that are more similar (e.g., separating scenes of a movie). In various embodiments, machine learning model 124 then provides the originally encoded feature vectors of the audio and video file to the enhanced machine learning model. In various embodiments, the machine learning model analyzes the originally encoded feature vectors of the audio and video file and outputs an updated embedding of feature vectors from the enhanced machine learning model.

In various embodiments, machine learning model 124 generates a new distance matrix that provides for an illustration of the distances between the video scenes. In various embodiments, machine learning model applies additional multimodal optimal sequence grouping to the distance matrix (e.g., the output embedding) to determine scene division probabilities based on vector proximity.

In operation 306, optimal sequence grouping program 126 determines the scene boundaries (î). In various embodiments, optimal sequence grouping program 126 utilizes the enhanced embedding produced as the output from the enhanced machine learning model 124 and generates an enhanced block diagonal structure. In various embodiments, machine learning model determines the distances between video scenes based on, at least, the block diagonal structure. In various embodiments, optimal sequence grouping program 126 receives, at least, a secondary enhanced block diagonal structure from the enhanced trained machine learning model (e.g., machine learning model 124) and again calculates a final value utilizing equations (1)-(6). The solved equation (6) provides the scene boundaries (î) for the video scenes, which illustrate an accurate and enhanced representation of the distances between the video scenes and the similarity of video scenes together.

Figure 4:
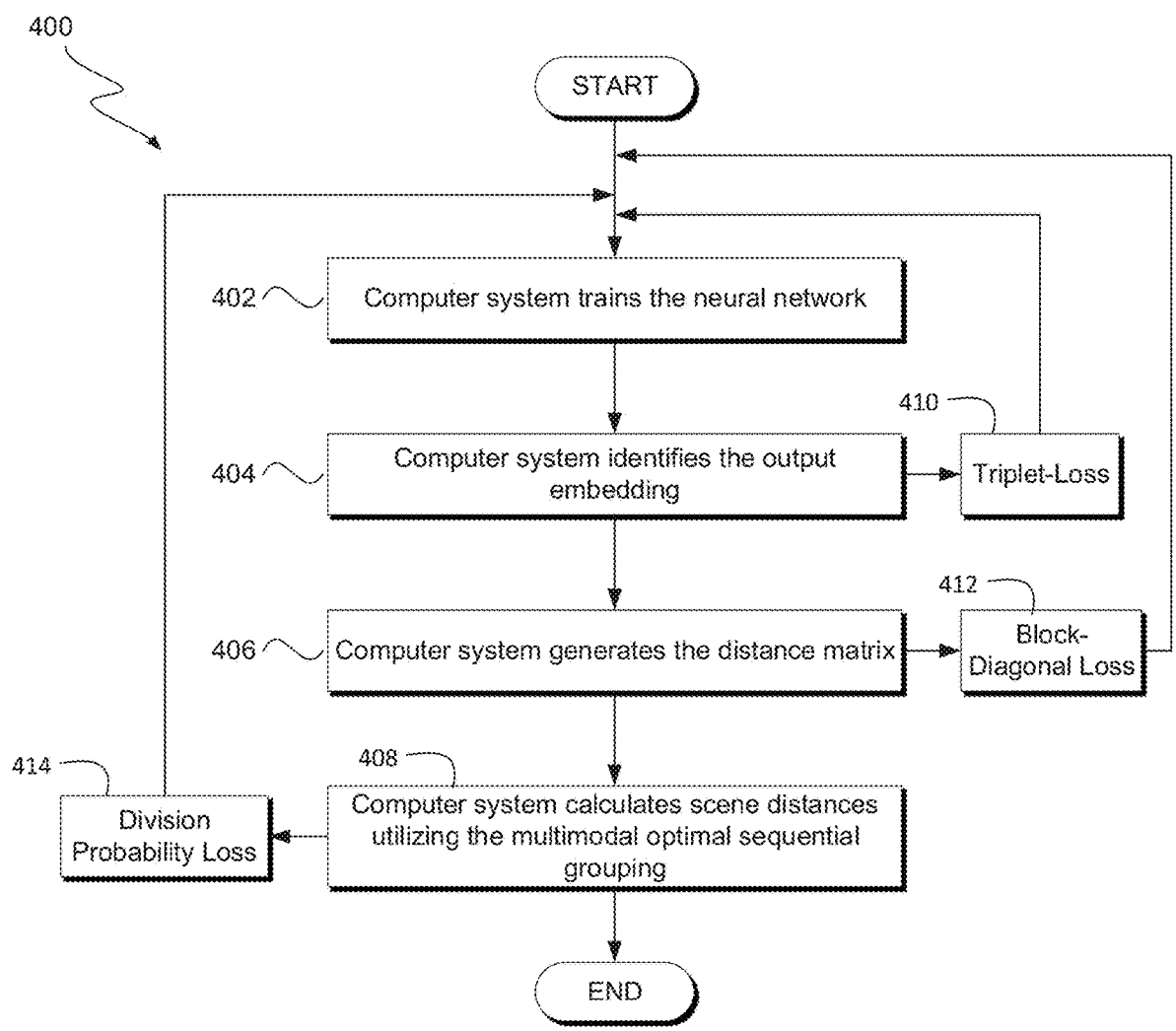
FIG. 4 illustrates operational process of executing a system for determining video scene detection according to at least one embodiment of the present invention.

FIG. 4 is a flowchart depicting operations for generating, modifying, leveraging, and/or executing a deep learning neural network for computing environment 100, in accordance with an illustrative embodiment of the present invention. More specifically, in this embodiment, FIG. 4, depicts overall operations 400, of scene division program 122 executing on computer system 120. FIG. 4 also represents certain interactions between machine learning model 124 and server application 132. Further, operations 400 can include a portion or all of combined overall operations of 200 and operations of 300. It should be appreciated that FIG. 4 provides an illustration of one implementation and does not imply any limitations with regard to the environments in which different embodiments may be implemented. Many modifications to the depicted environment may be made. In one embodiment, the series of operations depicted in FIG. 4 can be performed in any order. In another the series of operations, depicted in FIG. 4 can be performed simultaneously. Additionally, the series of operations, depicted in FIG. 4, can be terminated at any operations. In addition to the features mentioned, any operations, depicted in FIG. 4, can be resumed at any time.

In operation 402, machine learning model 124 trains the neural network as described above. In various embodiments, machine learning model 124 utilizes an inception-v3 architecture as a 2048-dimension visual backbone feature extractor for video analysis and a VGGish network to encode audio segments into 128-dimension vectors. In various embodiments, four fully-connected neural network layers are utilized to perform video scene division into semantic temporal chapters. In some embodiments, four layers are utilized for visual learning (e.g., 3000, 3000, 1000, 100 neurons) and four layers are utilized for audio learning (e.g., 200, 200, 100, 20 neurons). In various embodiments, machine learning model 124 applies batch normalization to, at least, the four layers for visual learning and the four layers for audio learning. Additionally, in various embodiments, machine learning model 124 applies ReLU activations to all layers of the neural network excluding the output layer. In various embodiments, machine learning model 124 utilizes an optimization framework to train the neural network at a learning rate of $5 \times 10^{-3}$. As discussed above, one having ordinary skill in the art would understand that the learning rate is a unit-less ratio multiplying the gradient. Machine learning model 124 applies a stopping criterion to avoid overfitting of the neural network, and the training module of the neural network is aborted when the training loss is decreased to 25% of the initial value. Additionally, machine learning model 124 normalizes the cosine distance (A), of equation (7) above, between 0 and 1 the margin (a), the value parameter of equation (7), is chosen as 0.5, and a long-elbow approach, as defined below, is utilized by machine learning model 124 to estimate the number of scenes from the video file (e.g., semantic temporal chapters). One having ordinary skill in the art understands that an optimization framework includes, but is not limited to, a gradient descent or ADAM optimization to learn the parameters of the machine learning model.

In various embodiments, scene division program 122 receives a video file that includes, but not limited to, visual and audio components. Scene division program 122 encodes the video and audio components into respective feature vectors, and scene division program 122 provides the encoded feature vectors to machine learning model 124 for the purposes of training the machine learning model. In various embodiments, machine learning model 124 analyzes and learns from the features vectors of the video and audio components and identifies the similarity between video scenes.

In operation 404, optimal sequence grouping program 126 identifies the output embedding. In various embodiments, the features extracted from the video scene division are fed through the fully connected neural network that outputs an embedding. In various embodiments, the embedding is utilized by the optimal sequential grouping algorithm, wherein the division of the video scenes is determined. Optimal sequence grouping program 126 calculates the loss by measuring the error in the division of the video scenes, wherein optimal sequence grouping program 126 back-propagates the loss through the optimal sequential grouping algorithm, as opposed to placing the loss directly back into the embedding output.

In various embodiments, the neural network outputs a feature space embedding that includes, but is not limited to, a visual embedding and an audio embedding of the video segments. Where samples from the same class (e.g. video segments) are close in the feature space, samples from different classes (e.g., video segments) are further apart. This allows for a rank of tasks, but for scene division, provides for triplet loss which causes samples to cluster together.

In operation 406, machine learning model 124 generates the distance matrix. In various embodiments, machine learning model 124 divides a video into semantic temporal chapters to generate a block-diagonal of the distance matrix, wherein the distance matrix represents the intra-scene distances. In various embodiments, the similarity of scenes is represented as a distance matrix and, generally, a block-diagonal structure is generated to represent that shots belonging to the same scene of a video will likely have lower distance values than shots belonging to different scenes. In various embodiments, machine learning model 124 utilizes the optimal sequential grouping algorithm to accomplish the division of the distance matrix represented by a block-diagonal structure with the lowest intra-scene distances.

In operation 408, optimal sequence grouping program 126 calculates scene distances utilizing the multimodal optimal sequential grouping. Embodiments of the present invention provide that optimal sequence grouping program 126 calculates the values using equation (1)-(6) to determine the scene boundaries (i). Optimal sequence grouping program 126 utilizes the distance matrix represented by a block-diagonal structure and applies multimodal optimal sequential grouping to learn from the data to further enhance the accuracies of the visual and audio embedding and the representation of the distance matrix of the various shots within the video file.

In operation 410, scene division program 122 applies triplet loss back through the neural network. In various embodiments, machine learning learns a feature space embedding where samples from the same class are close in the feature space while samples from different classes are further apart. Embodiments of the present invention provide for scene division program 122 to strive to minimize the distances between the video segments from the same scene and raise the distances between shots belonging to different scenes. Additionally, triplet loss focuses on distinct samples.

In operation 412, scene division program 122 applies block-diagonal loss back through the neural network. In various embodiments, scene division program 122 determines that through a video some video segments may be quite similar to each other, but their temporal distance or an intervening scene indicate their distinction. The cost function (e.g., equation (6)) accumulates the far off-diagonal values do not impact the decision as long as the values in between are high enough. In some embodiments, a slight variant of block-diagonal loss is to consider the inter-scene distances between scenes which are not adjacent to each other, known as block-adjacent. Block-diagonal loss strives to minimize the distances between shots from the same scene and raise the distances between shots belonging to different scenes, as similar to triplet loss. However, block-diagonal loss strengthens the block-diagonal structure to better help the performance of the optimal sequential grouping algorithm.

In operation 414, optimal sequence grouping program 126 applies division probability loss back through the neural network. In various embodiments, division probability loss emphasizes the value of the average probability of the scene division. Additionally, division probability loss is configured to be reliant on division location as opposed to the block-diagonal. In various embodiments, a structure reliant on division probability loss allows the optimal sequential grouping algorithm to be integrated into a larger learning pipeline.

Figure 5A:
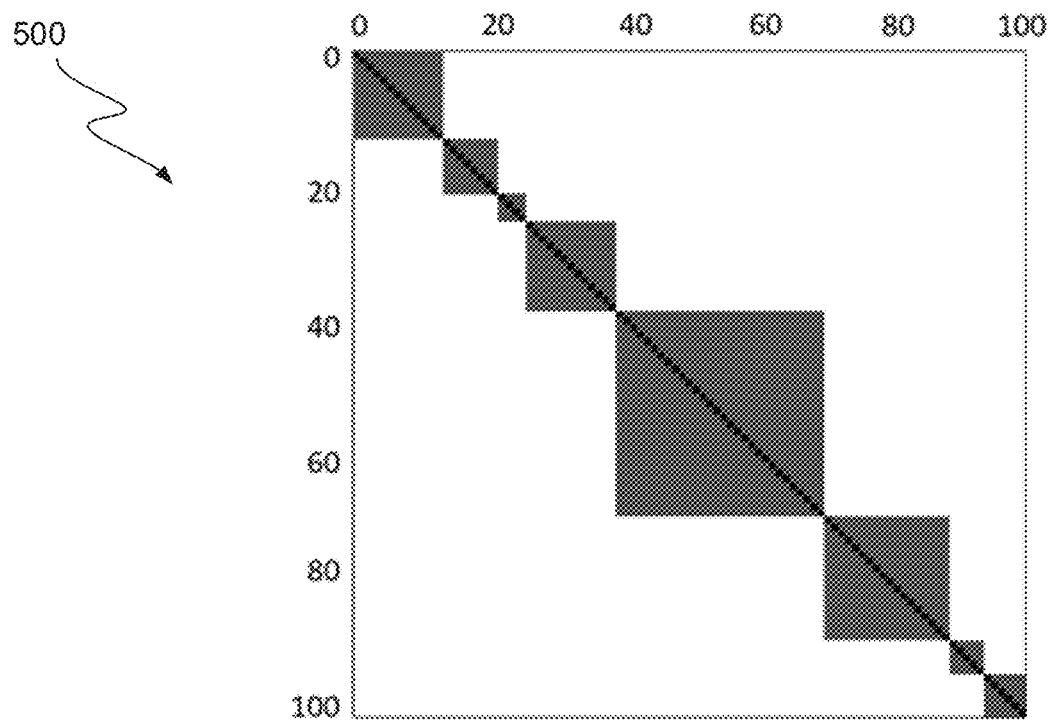
FIG. 5A depicts a block diagram of a distance matrix according to at least one embodiment of the present invention.

FIG. 5A depicts a block-diagonal structure 500 that includes various video segments, or shots, clustered together, as indicated by the various dark-colored squares, according to an embodiment of the present invention. In this embodiment, higher values are assigned an intensity levels of the blocks, and a dark block is a sequence of video segments with low intra-distances which likely indicates a scene.

Figure 5B:
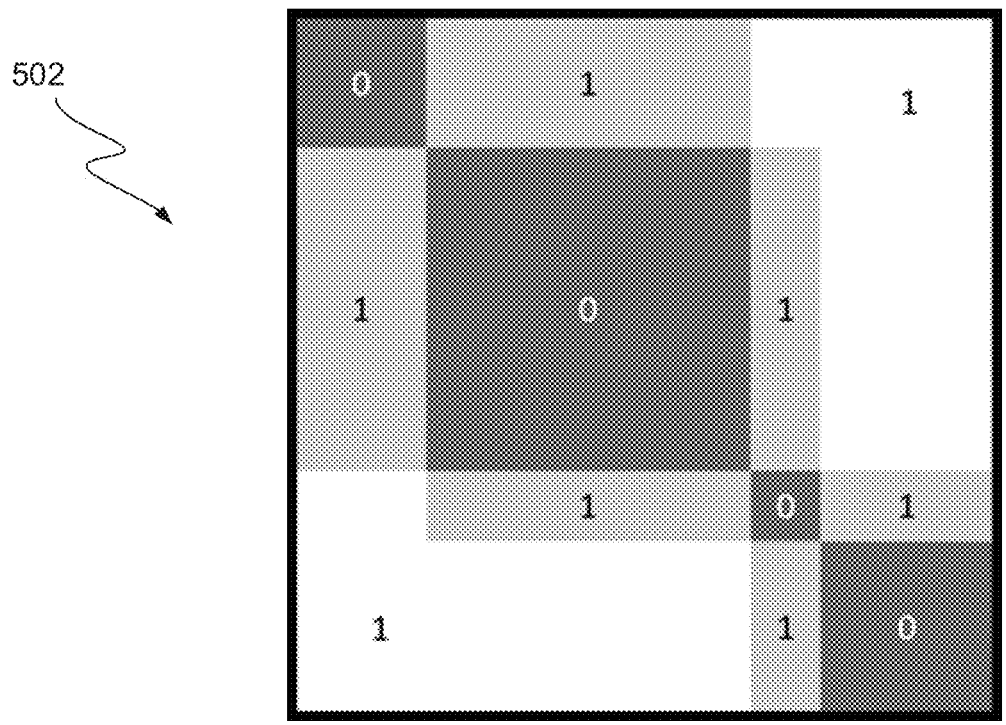
FIG. 5B depicts an adjacent block diagram of a distance matrix according to at least one embodiment of the present invention.

FIG. 5B depicts a similar block-diagonal structure that includes block-adjacent portions 502 of the distance matrix, according to an embodiment of the present invention. In this embodiment, the block-diagonal structure depicts the loss between the inter-scene distances for scenes which are not adjacent to each other (e.g., block-adjacent). In various embodiments, the darker squares represent the intra-distances of the video segments (e.g., block-diagonal) and the lighter colored squares represent the inter-scene distances (e.g., block-adjacent).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned model may include at least five characteristics, at least three service models, and at least four deployment models.

Characteristics are as follows:

On-demand self-service: a cloud consumer can unilaterally provision computing capabilities, such as server-time and network storage, as needed automatically without requiring human interaction with the service's provider.

Broad network access: capabilities are available over a network and accessed through standard mechanisms that promote use by heterogeneous thin or thick client platforms 9e.g., mobile phones, laptops and PDAs).

Resource pooling: the provider's computing resources are pooled to serve multiple consumer using a multi-tenant model, with different physical and virtual resources dynamically assigned and reassigned according to demand. There is a sense of location independence in that the consumer generally has not control or knowledge over the exact locations of the provided resources but may be able to specify location at a higher level of abstraction (e.g., country, state, or datacenter).

Rapid elasticity: capabilities can be rapidly and elasticity provisioned, in some cases automatically, to quickly scale out and rapidly released to quickly scale in. To the consumer, the capabilities available for provisioning often appear to be unlimited and can be purchased in any quality at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual applications capabilities, with the possible exception of limited user-specific application configuration settings.

Platform as a Service (PaaS): the capability provided to the consumers to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environmental configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or large industry group and is owned by an organization selling cloud services.

Hybrid cloud: the cloud infrastructure is a composition of two or more cloud (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
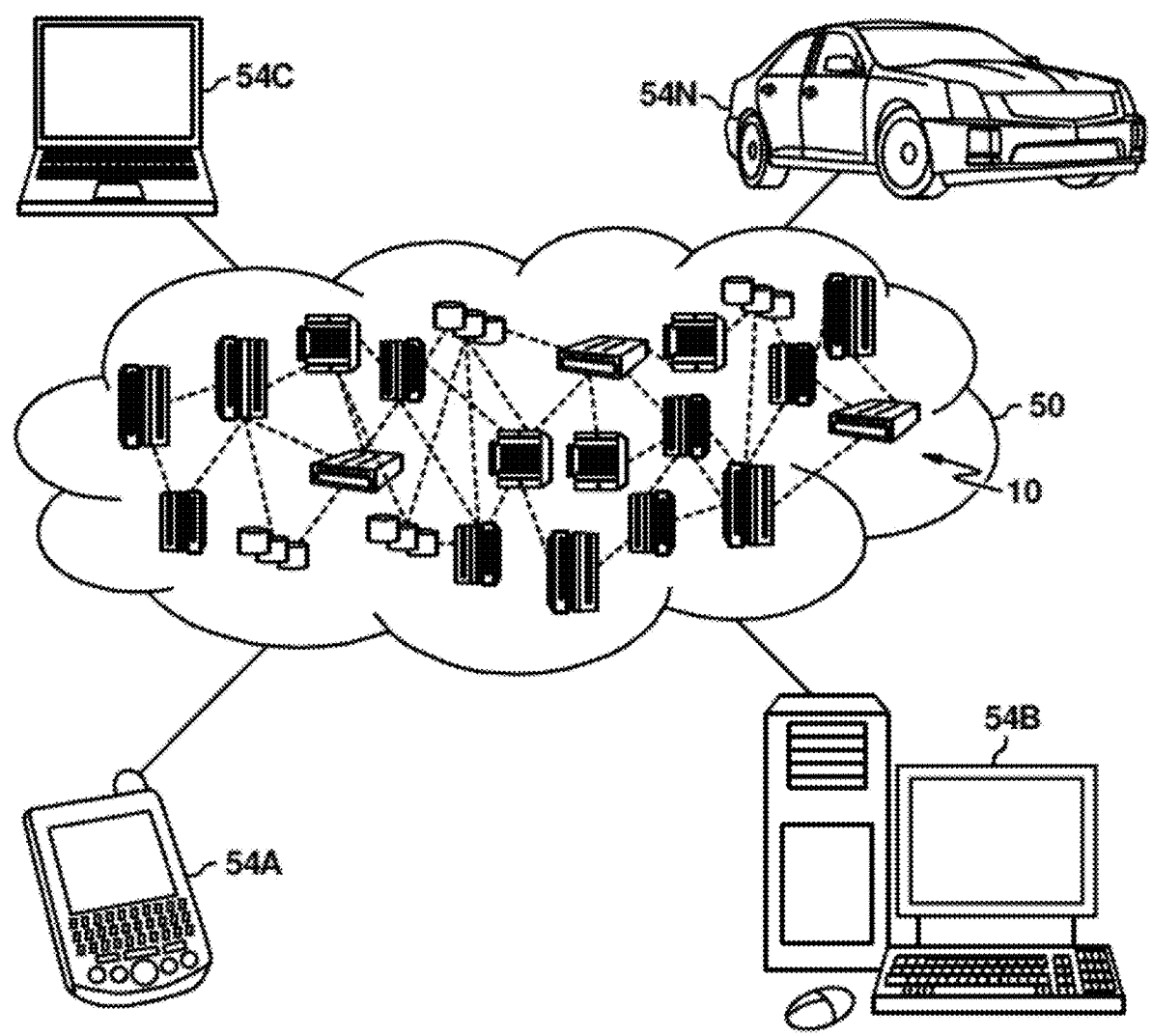
FIG. 6 depicts a cloud computing environment according to at least one embodiment of the present invention.

Referring now to FIG. 6, illustrative cloud computing environment 50 is depicted. As shown, cloud computing environment 50 includes one or more cloud computing nodes 10 with which local computing devices used by cloud consumer: such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
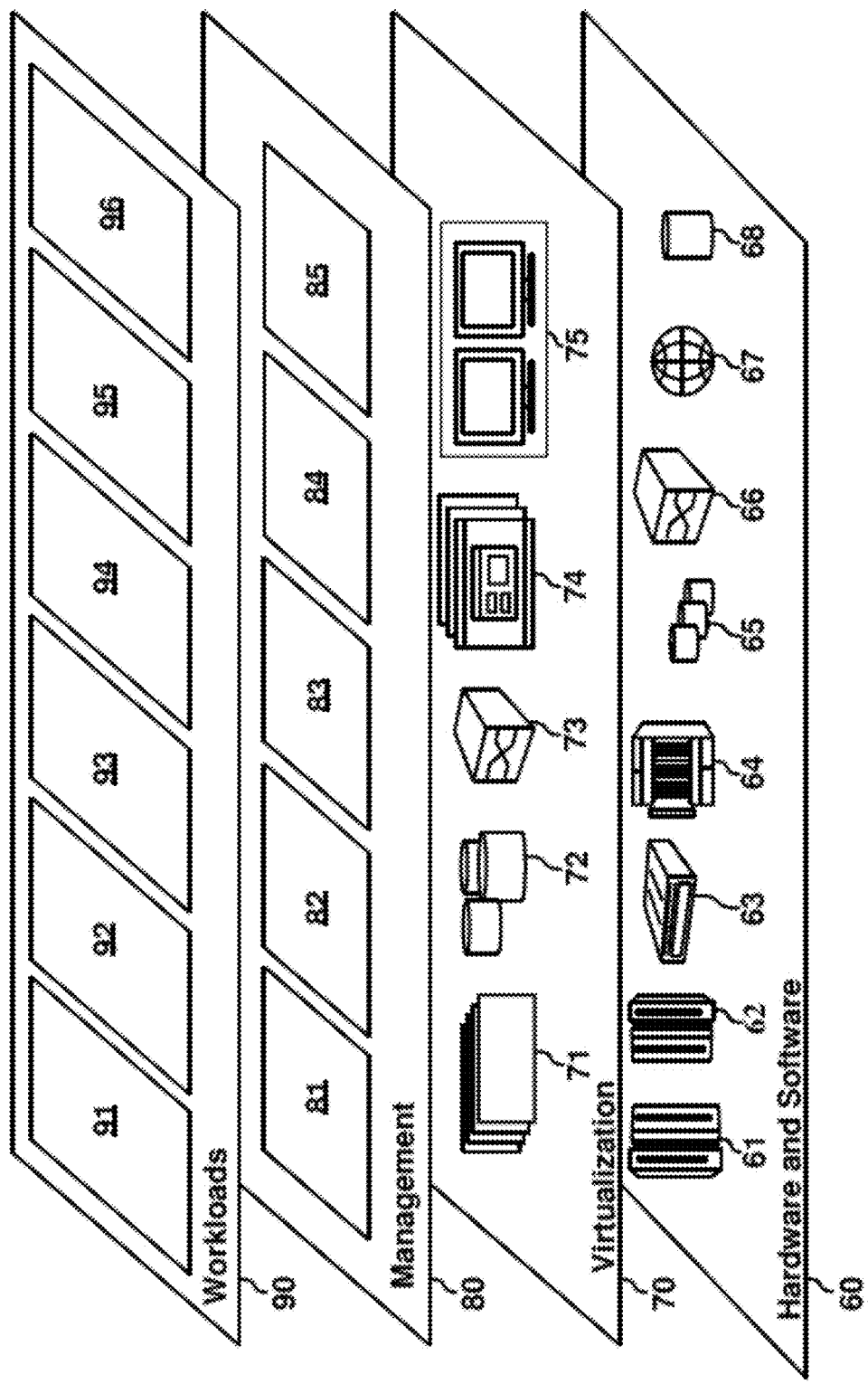
FIG. 7 depicts abstraction model layers according to at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instructions Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include applications software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 8:
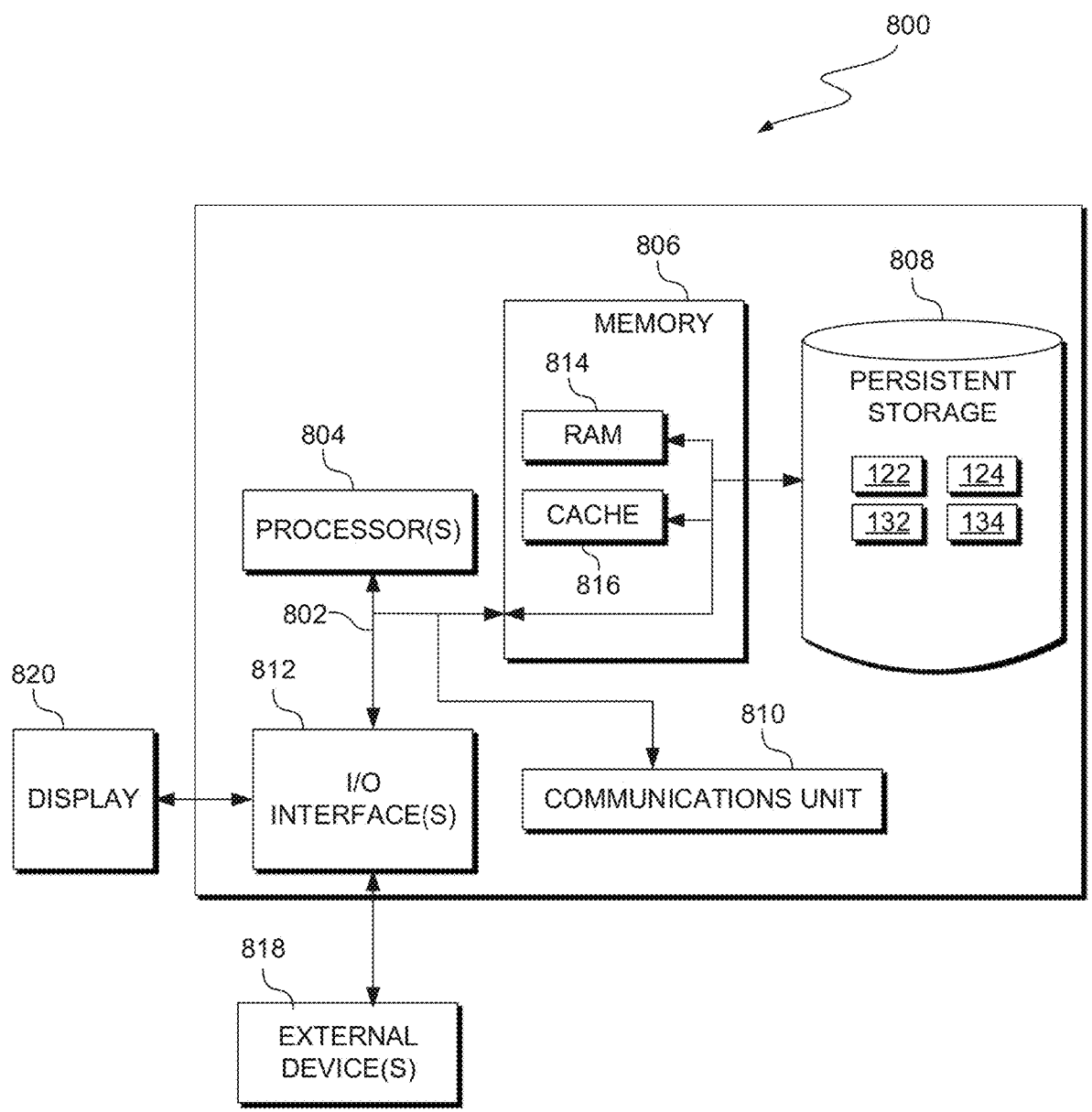
FIG. 8 depicts a block diagram of components of one or more computing devices within the computing environment depicted in FIG. 1, in accordance with an exemplary embodiment of the present invention.

FIG. 8 depicts a block diagram, 800, of components of computer system 120 and storage area network 130, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computer system 120 and storage area network 130 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Scene division program 122, machine learning model 124, optimal sequence grouping program 126, computer interface 128, server application 132, and database 134 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 110. In these examples, communications unit 810 includes one or more network interface cards. Communications unit 810 may provide communications through the use of either or both physical and wireless communications links. Scene division program 122, machine learning model 124, optimal sequence grouping program 126, computer interface 128, server application 132, and database 134 may be downloaded to persistent storage 808 through communications unit 810.

I/O interface(s) 812 allows for input and output of data with other devices that may be connected to computer system 120 and storage area network 130. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., scene division program 122, machine learning model 124, optimal sequence grouping program 126, computer interface 128, server application 132, and database 134, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method for use with a trained neural network including a scene detection machine learning model and with a video made up of a plurality of shots, the method comprising:
   receiving a plurality of feature vectors corresponding to video components of a video presentation;
   applying the scene detection model of the trained neural network to the plurality of feature vectors to obtain a plurality of output feature vectors, with each output feature vector respectively corresponding to a shot of the video presentation;
   applying deterministic optimization formulations of an optimal sequence grouping algorithm to the output feature vectors to solve for a video scene detection scheme that divides the plurality of shots into a plurality of scenes, with each scene including one, or more, shots of the plurality of shots of the video presentation; and
   further training, by one or more processors, the trained neural network based, at least in part, on the video scene detection scheme.

2. The computer-implemented method of claim 1 wherein the deterministic optimization formulations of the optimal sequence grouping algorithm include:
   taking a distance matrix of the plurality of shots, and
   calculates an optimal scene division scheme based, at least in part, upon a cost function operating on intra-scene distances determined from the distance matrix.

3. A computer-implemented method for use with a trained neural network including a scene detection machine learning model and with a video made up of a plurality of shots, the method comprising:
   receiving a plurality of feature vectors corresponding to audio components of a video presentation;
   applying the scene detection model of the trained neural network to the plurality of feature vectors to obtain a plurality of output feature vectors, with each output feature vector respectively corresponding to a shot of the video presentation;
   applying deterministic optimization formulations of an optimal sequence grouping algorithm to the output feature vectors to solve for a video scene detection scheme that divides the plurality of shots into a plurality of scenes, with each scene including one, or more, shots of the plurality of shots of the video presentation; and
   further training, by one or more processors, the trained neural network based, at least in part, on the video scene detection scheme.

4. The computer-implemented method of claim 1 wherein the deterministic optimization formulations of the optimal sequence grouping algorithm include:
   taking a distance matrix of the plurality of shots, and
   calculates an optimal scene division scheme based, at least in part, upon a cost function operating on intra-scene distances determined from the distance matrix.

5. A computer-implemented method for use with a trained neural network including a scene detection machine learning model and with a video made up of a plurality of shots, the method comprising:
   receiving a plurality of feature vectors corresponding to video components and audio components of a video presentation;
   applying the scene detection model of the trained neural network to the plurality of feature vectors to obtain a plurality of output feature vectors, with each output feature vector respectively corresponding to a shot of the video presentation;
   applying deterministic optimization formulations of an optimal sequence grouping algorithm to the output feature vectors to solve for a video scene detection scheme that divides the plurality of shots into a plurality of scenes, with each scene including one, or more, shots of the plurality of shots of the video presentation; and
   further training, by one or more processors, the trained neural network based, at least in part, on the video scene detection scheme.

6. The computer-implemented method of claim 1 wherein the deterministic optimization formulations of the optimal sequence grouping algorithm include:
   taking a distance matrix of the plurality of shots, and
   calculates an optimal scene division scheme based, at least in part, upon a cost function operating on intra-scene distances determined from the distance matrix.

* * * * *